No. 656,310. Patented Aug. 21, 1900.
F. J. WARBURTON.
BEARING FOR SHAFTS.
(Application filed Dec. 8, 1899.)
(No Model.) 2 Sheets—Sheet 1.
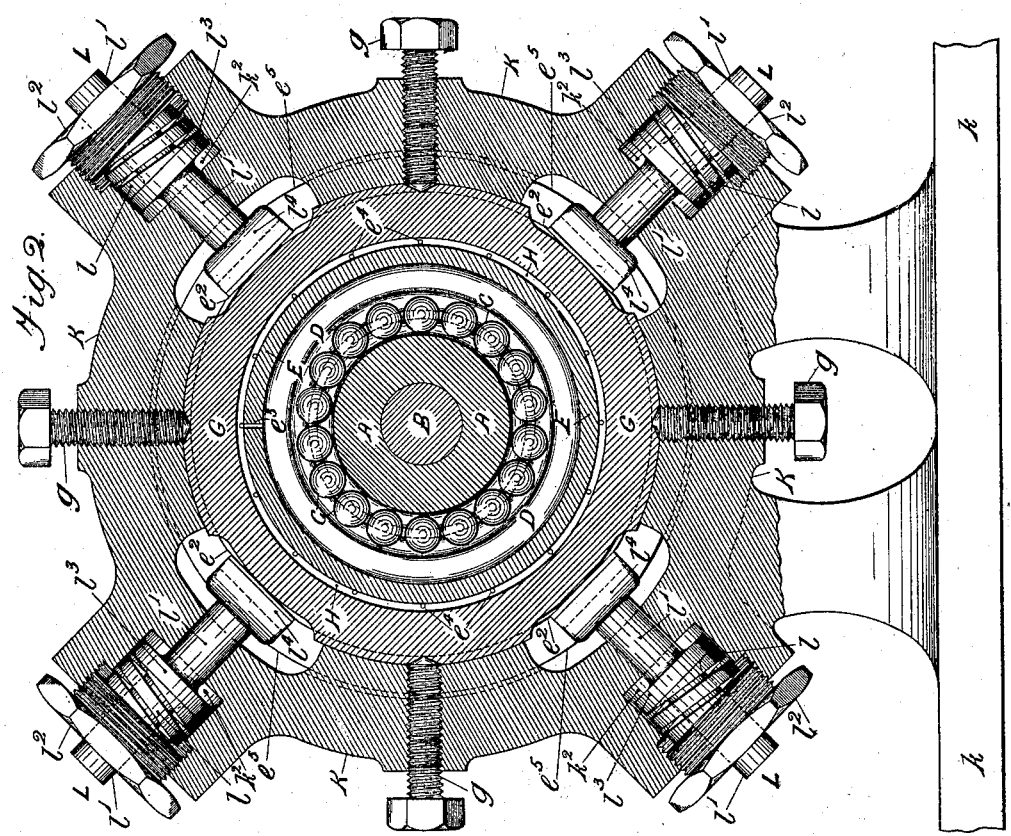
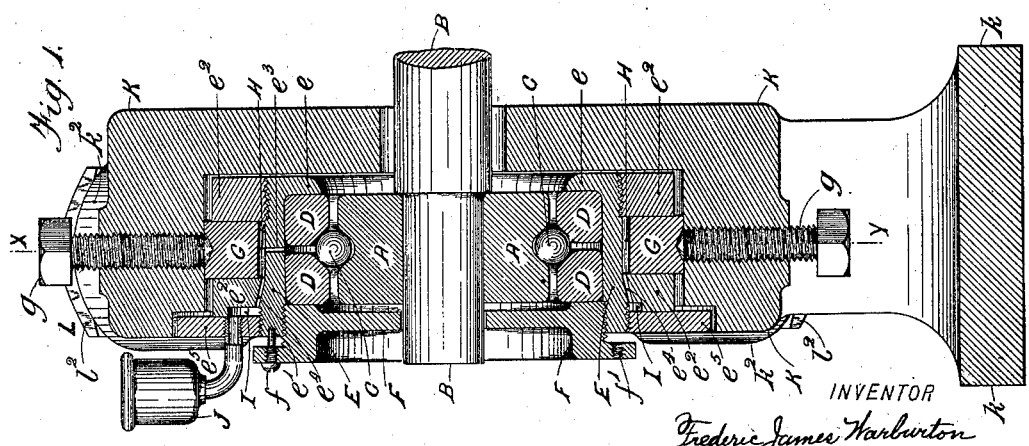

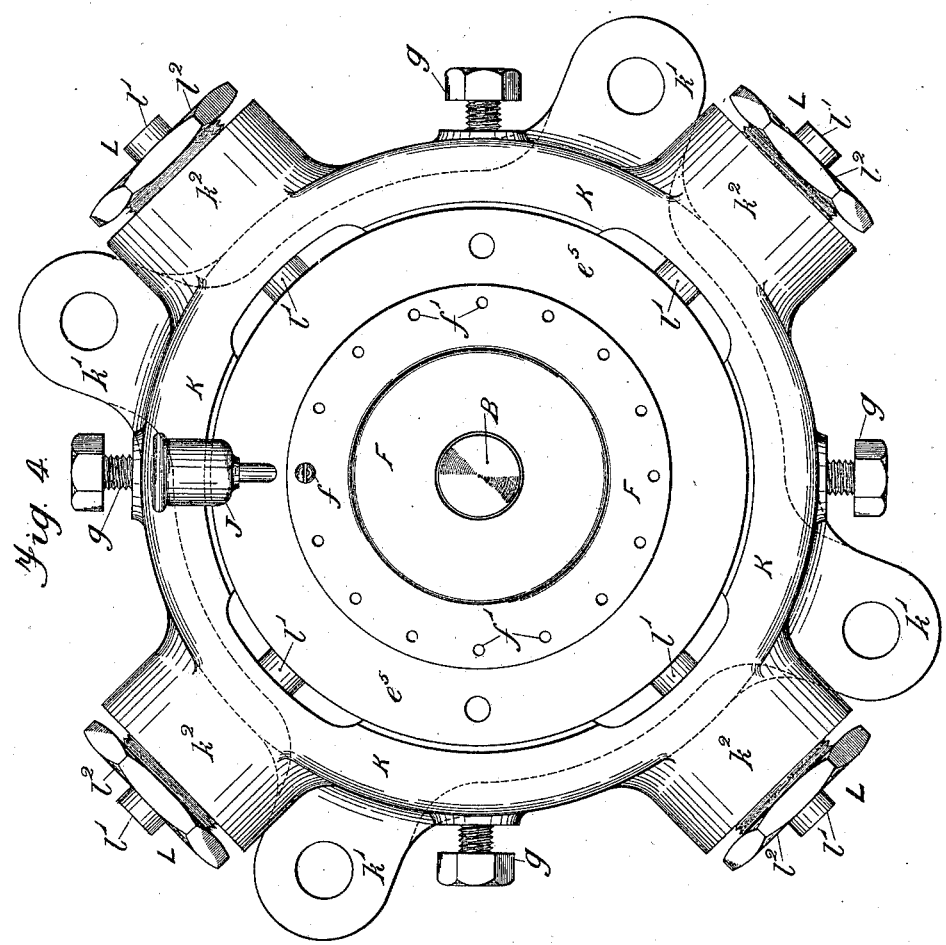
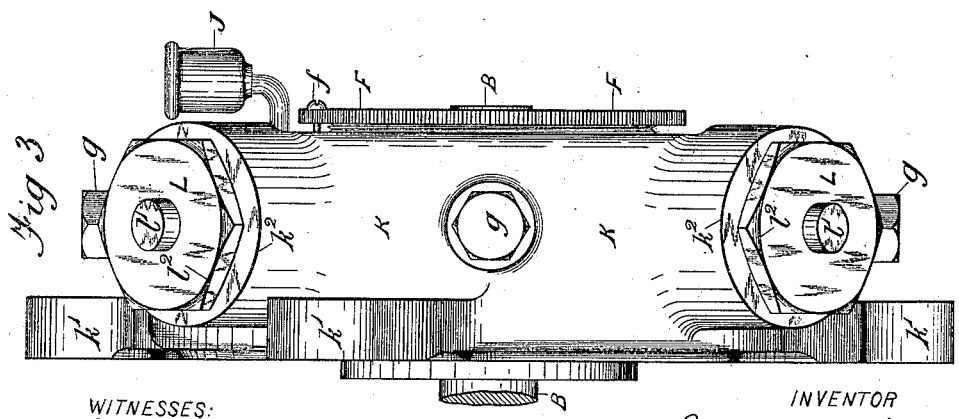

UNITED STATES PATENT OFFICE.

FREDERIC JAMES WARBURTON, OF NEWCASTLE-UPON-TYNE, ENGLAND.

BEARING FOR SHAFTS.

SPECIFICATION forming part of Letters Patent No. 656,310, dated August 21, 1900.

Application filed December 8, 1899. Serial No. 739,648. (No model.)

*To all whom it may concern:*

Be it known that I, FREDERIC JAMES WARBURTON, a subject of the Queen of Great Britain and Ireland, residing at and whose post-office address is 30 Burdon Terrace, Newcastle-upon-Tyne, in the county of Northumberland, England, have invented certain new and useful Improvements in Bearings for Shafts or Spindles, (for which I have applied for patents in Great Britain under No. 1,168, dated January 18, 1899, and in Germany under Kaffenbuch No. 11,457, dated June 22, 1899,) of which the following is a specification.

My invention relates to bearings for shafts or spindles revolving at high speeds, as in or in connection with quick-running motors or machines, in which bearings it is necessary to provide for lateral movement to meet the effect arising from want of balance in the rotating part.

To this end the invention comprises a bearing for the shaft with yielding means for supporting and centering the same and an auxiliary cushioning arrangement arranged to retard the lateral shifting of the bearing.

I will fully describe my invention with reference to the accompanying drawings, which show a complete bearing constructed in accordance with my improvements.

Of the drawings, Figure 1 is a central longitudinal section. Fig. 2 is a transverse section on the line X Y in the preceding figure looking to the left, and Figs. 3 and 4 are respectively side and end elevations illustrating a modified form of the external casing represented in Figs. 1 and 2.

According to the illustrated mode of carrying out my invention I form the periphery of the bush A, wherein the shaft or spindle B is keyed or otherwise fixed to rotate therewith, to receive and revolve upon a series of antifriction-balls C C, maintained in position by rings or cones D D, in turn encircled by an open-ended cylinder or sleeve E, provided at one extremity with an internal flange or collar $e$, between which and a nut F the bush A and cones D D are retained. The nut F serves to effect the requisite adjustment of the cones D D for wear, and it is locked in position by a set-screw $f$, inserted into a hole $e'$ (indicated in Fig. 1) in the end of the cylinder E through one of the graduated series of holes $f'$ $f'$ made in the face of the nut F. However, if very fine adjustment is required, there may be more than one hole $e'$, though usually one will be ample. The nut F is shown as almost meeting the shaft B. This is not necessary, but only advisable for preventing the entry of dust and dirt. The cylinder E is also furnished at each end with an external flange or collar $e^3$, between which a ring G is located, so as to abut well but easily thereagainst and establish, with same and the cylinder or sleeve E, an annular space H, connecting, by way of an orifice $e^3$ in the cylinder E, with the bush A and, by means of a series of small orifices $e^4$ $e^4$, also in the cylinder E, with another space I, formed in the left flange $e^2$ and closed by a ring $e^5$, screwed upon the cylinder E. Oil or other liquid is supplied to this space I from a cup J (or other source) and flows to the space H and the bush A by the orifices $e^4$ $e^4$ and $e^3$, respectively. I prefer to fix the inner flange or collar $e^2$ of the cylinder E by screwing, as represented in Fig. 1, for in this way the adjustment for wear of the ring G can be conveniently effected. The cylinder E, with its ring G, is inserted and retained in an appropriately-founded casing or other convenient recessed part K, made of such a diameter in regard to the cylinder and ring as to leave clearance around the former, but be in tight contact with the ring, in which condition the ring is locked by screws $g$ $g$, passed through the casing or part K, all as shown in Figs. 1 and 2. The shape of the casing or part K is determined by the service. Two forms are exemplified in the drawings, that shown in Figs. 1 and 2 being suitable for fixture to a bed-plate or other base, for which it is provided with a flange $k$, while the design illustrated in the other figures is applicable to motors of the inclosed type, the casing K being bolted at the end of the motor-casing by means of lugs $k'$ $k'$. Within the casing K the cylinder E is supported by radially-disposed elastic contrivances L L, each consisting of a spring $l$, situated within a cavity $k^2$ in the casing K and coacting with a plunger $l'$, seated at one extremity upon the cylinder or sleeve E and guided at the other by a gland-nut $l^2$, closing the cavity $k^2$. This arrangement is clearly illustrated in Fig. 2, from which it will be seen that the spring $l$ abuts upon the nut $l^2$ and a collar $l^3$ on the plunger $l'$, which rests upon the cylinder E through the bridge-piece $l^4$, resting upon a cut-away or flattened portion of the flanges $e^2 e^2$, and in this way a good bearing is insured. The casing K and ring G are shown as recessed around these contrivances L L. This is for the purpose of permitting the reception of the bridge-piece $l^4$. By this construction and disposition as the shaft or spindle B revolves friction is minimized by the balls C C, longitudinal motion is avoided by the fixture of the ring G, disposed on the cylinder E, and freedom to move transversely is permitted by the fit of the ring G between the flanges $e^2 e^2$. The liquid held in the space H acts as a cushion to retard the movement of the bearing. As the oil is forced out of one part of this space by this lateral movement of the bearing, due to the vibration of the shaft, some of it will be forced through the orifice $e^3$ to the ball-bearings to lubricate the same.

The resilient devices L L tend to support and normally center the bearing.

Thus it will be evident that by my invention I provide a very effective bearing for the particular use specified, and though I have only described and illustrated one form of it, because it is the one I find by experiment to meet my purpose well, yet I wish it understood that I do not limit myself to the exact details, as they are capable of various modification without departing from the principle of the bearing.

What I claim as my invention, and desire to secure by Letters Patent, is—

1. In a bearing for shafts having vibratory movement, the combination with a shaft, of a bearing therefor, yielding devices for supporting and centering the bearing and means for cushioning said bearing independent of said yielding devices.

2. The combination with a shaft having vibratory movement, of a bearing therefor, resilient devices for centering said shaft, and means for providing a liquid cushion for said bearing.

3. A bearing for shafts or spindles comprising the combination of a bush revolving upon antifriction-balls, an open-ended cylinder or sleeve encircling same and provided with external flanges, a ring establishing with the cylinder and flanges a space connecting with the bush and with another space in one of the flanges, a casing in which the cylinder or sleeve and ring are inserted, and elastic contrivances in the casing for supporting the cylinder, substantially as described.

In witness whereof I have hereunto set my hand in the presence of two witnesses.

FREDERIC JAMES WARBURTON.

Witnesses:
JAMES ANDREW HARVEY,
ALFRED G. BRATTON.